Figure 15:
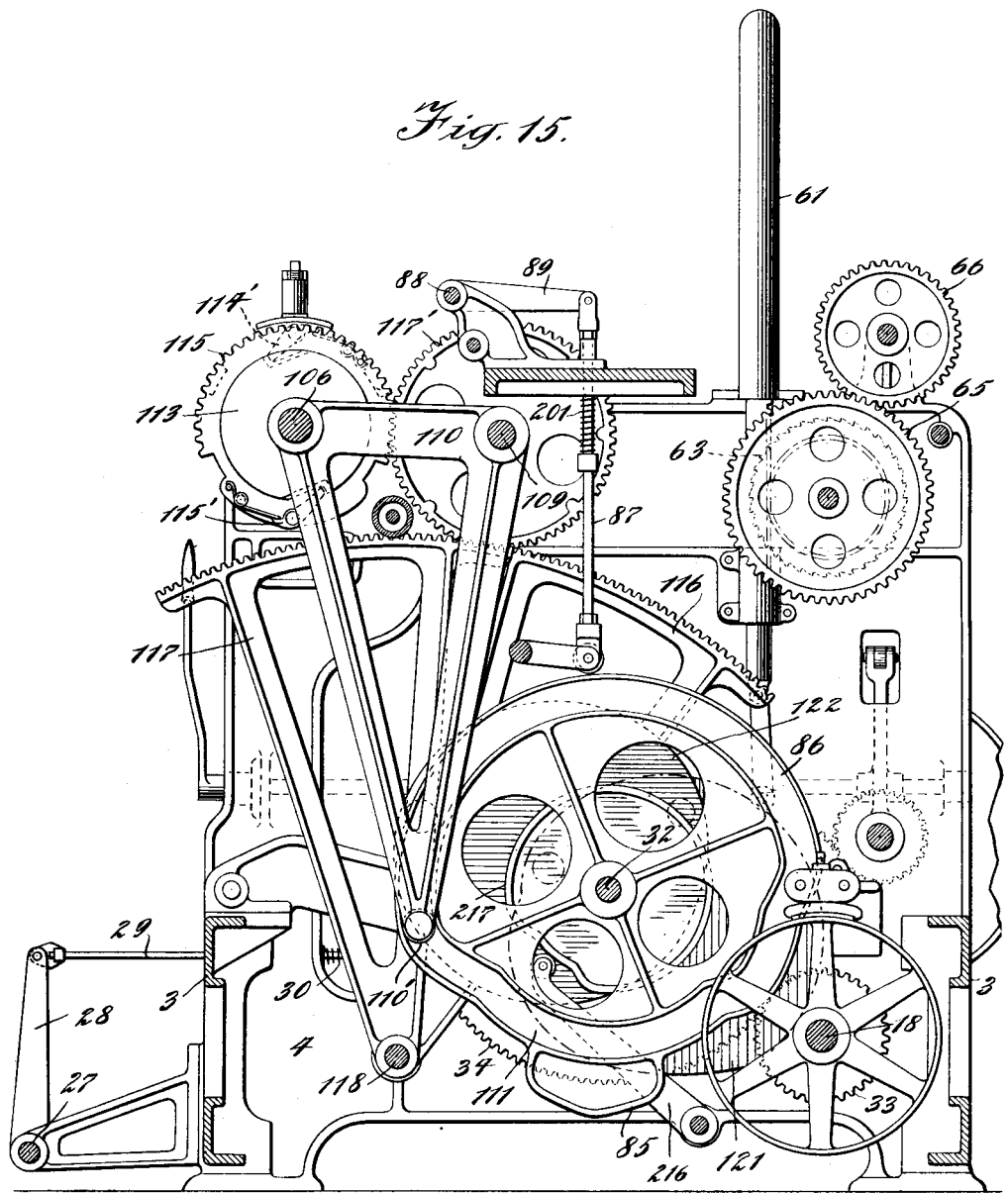

E. M. HAWKINS & C. R. SEYMOUR.
STAY APPLYING MACHINE.
APPLICATION FILED JAN. 7, 1913.
1,171,949.
Patented Feb. 15, 1916.
15 SHEETS—SHEET 1.
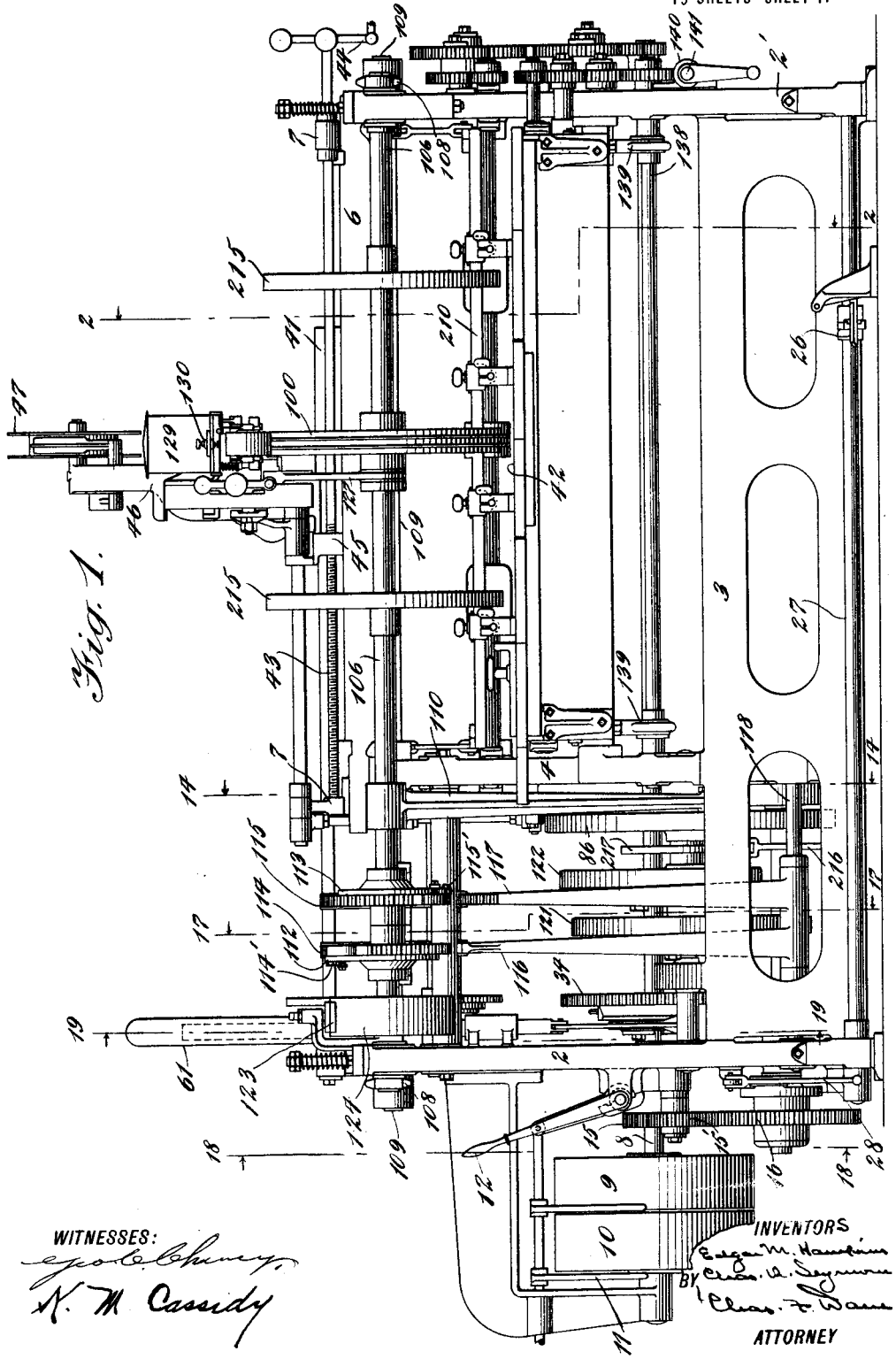

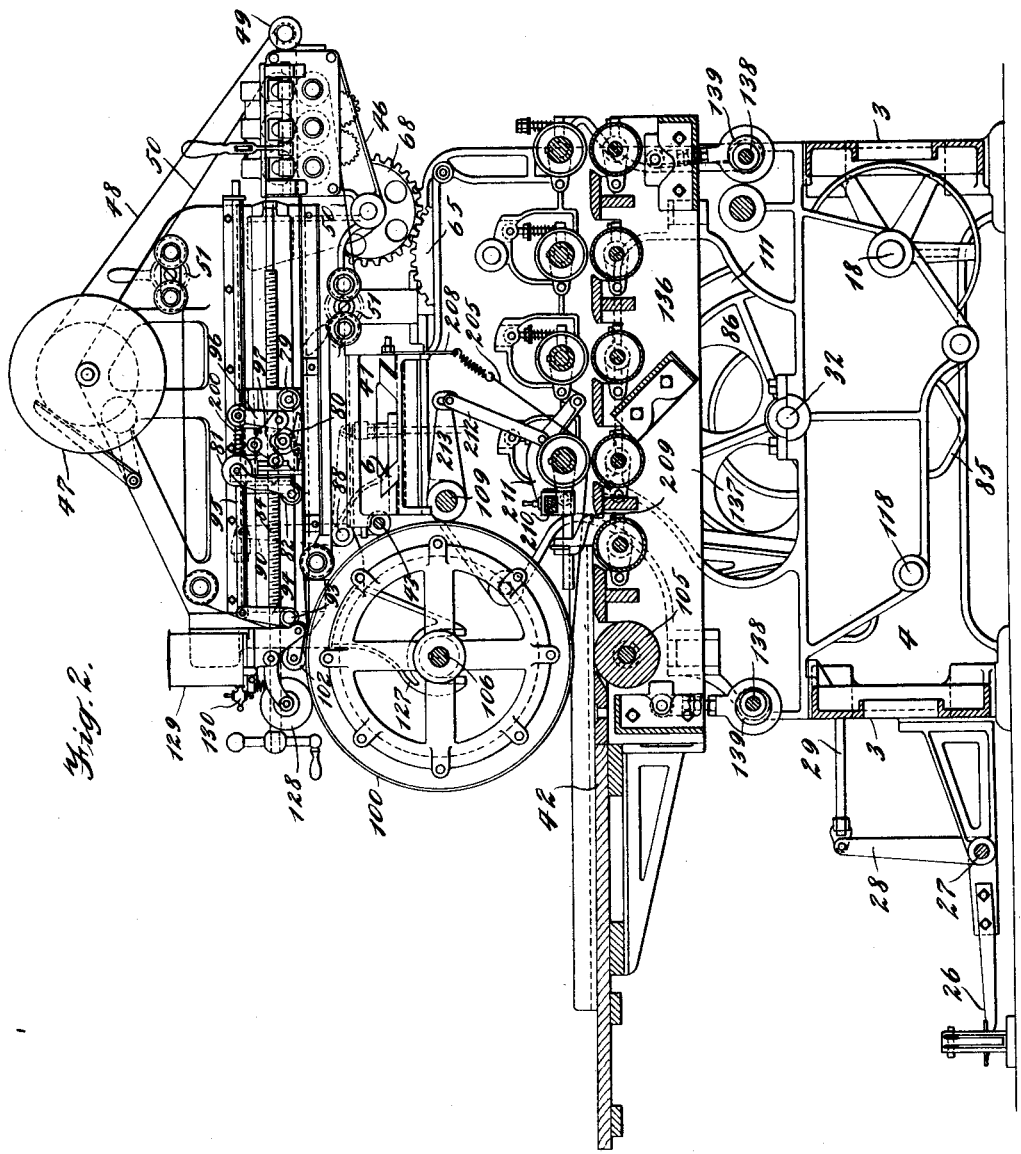

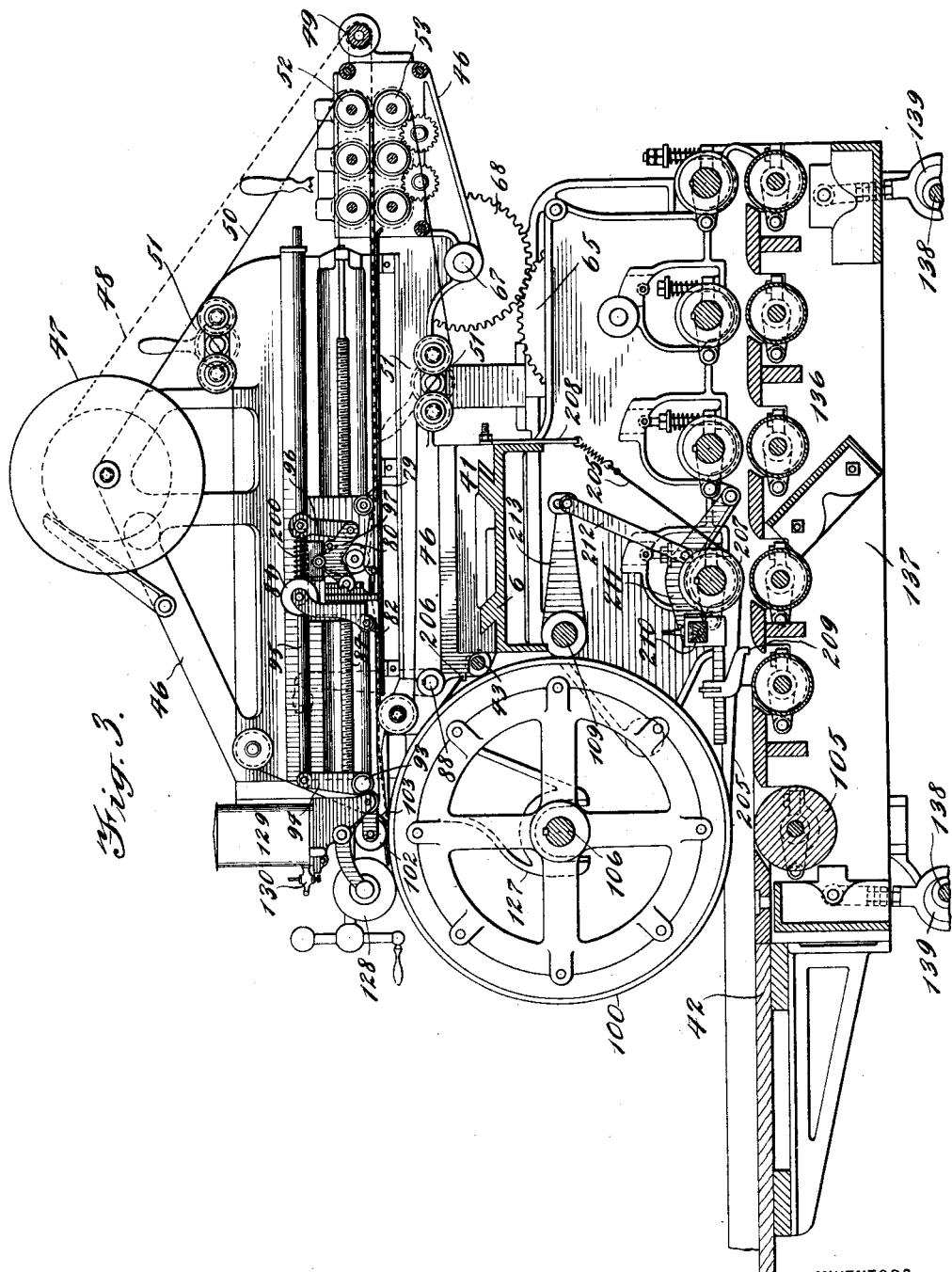

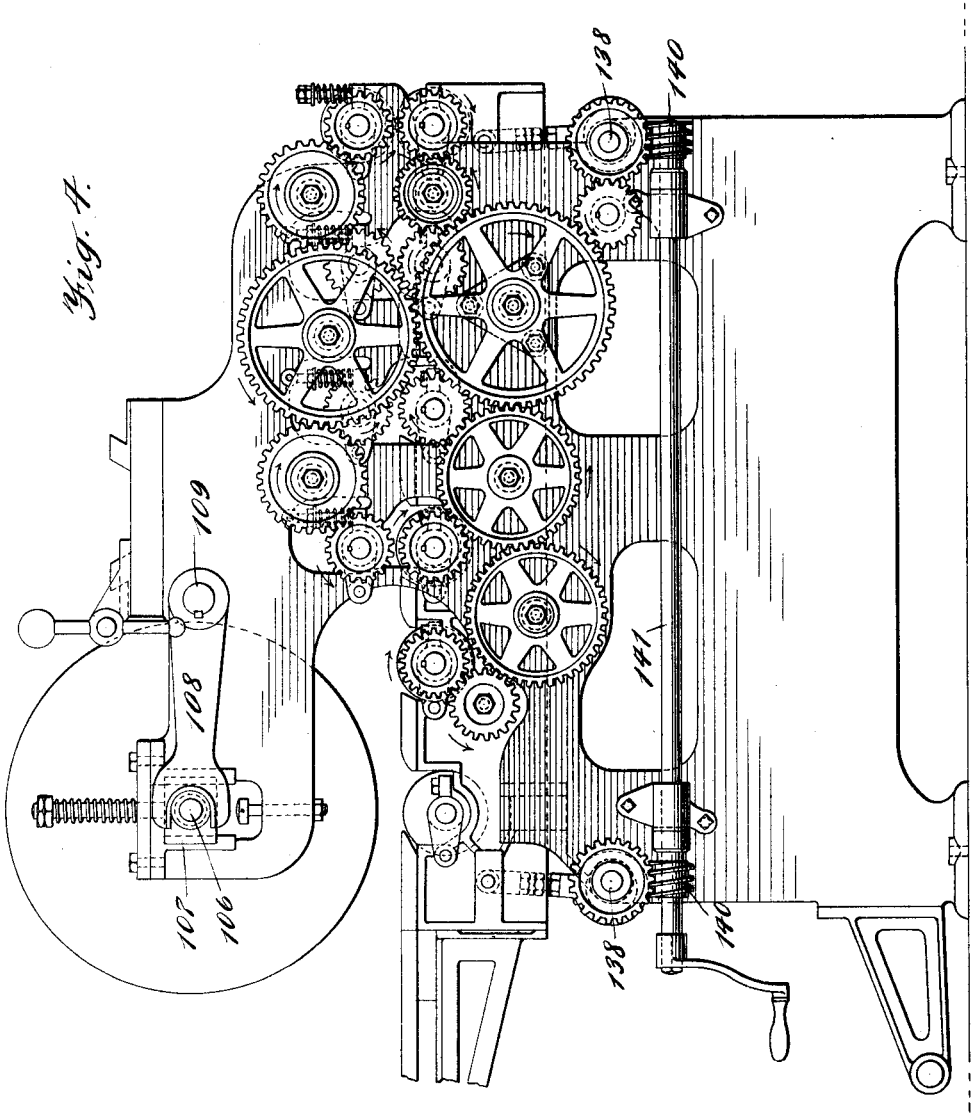

E. M. HAWKINS & C. R. SEYMOUR.
STAY APPLYING MACHINE.
APPLICATION FILED JAN. 7, 1913.
1,171,949.
Patented Feb. 15, 1916.
15 SHEETS—SHEET 5.
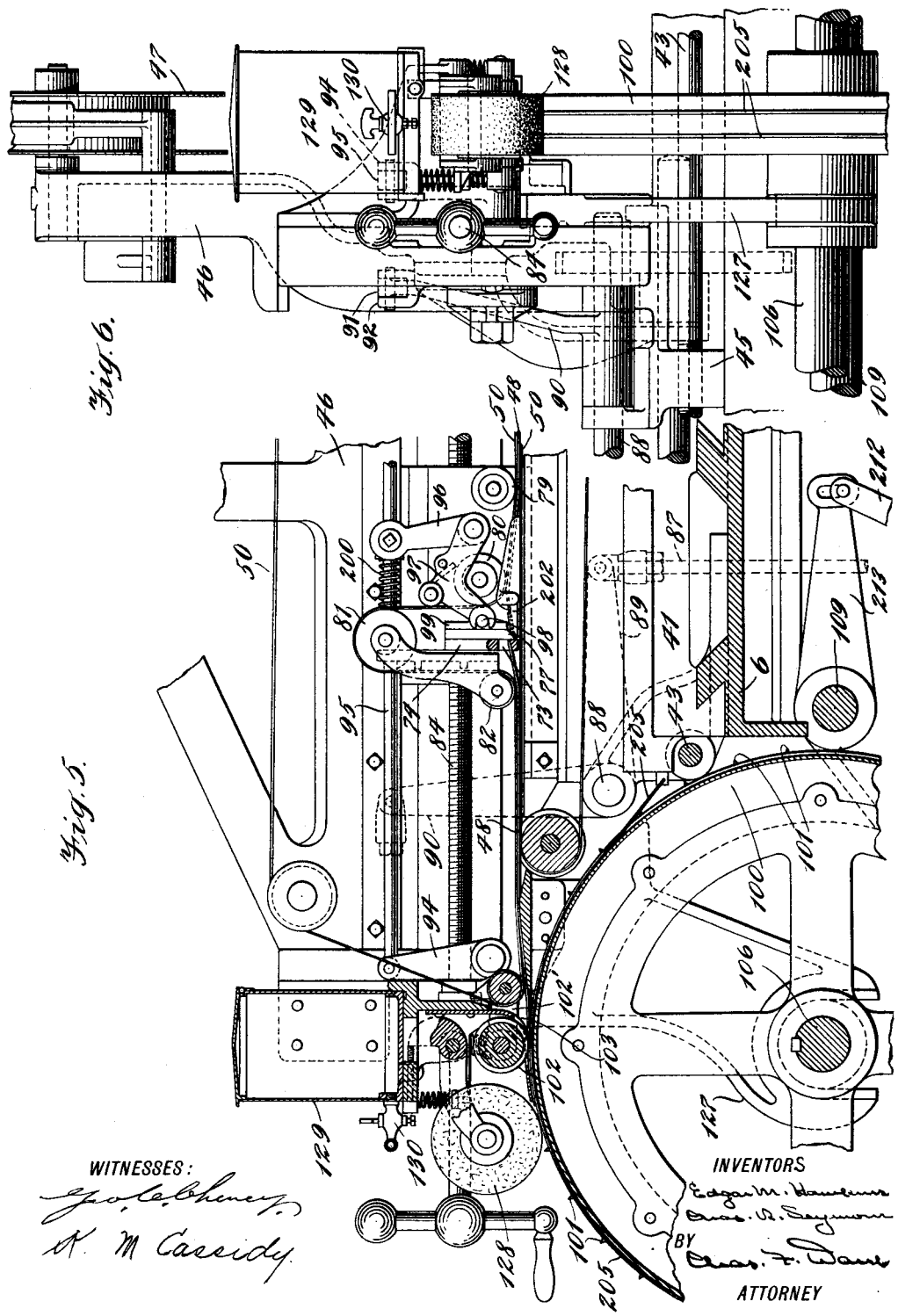

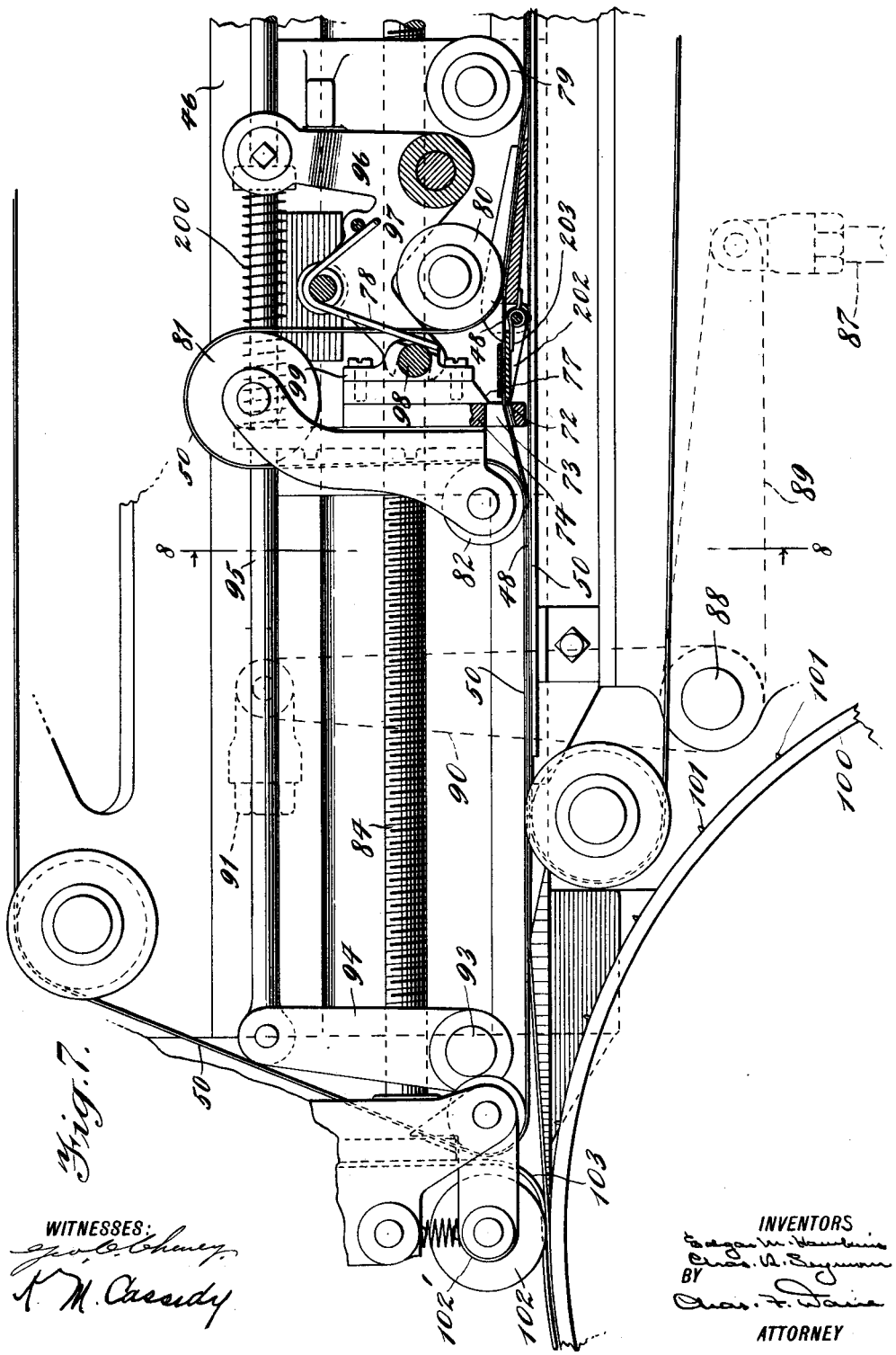

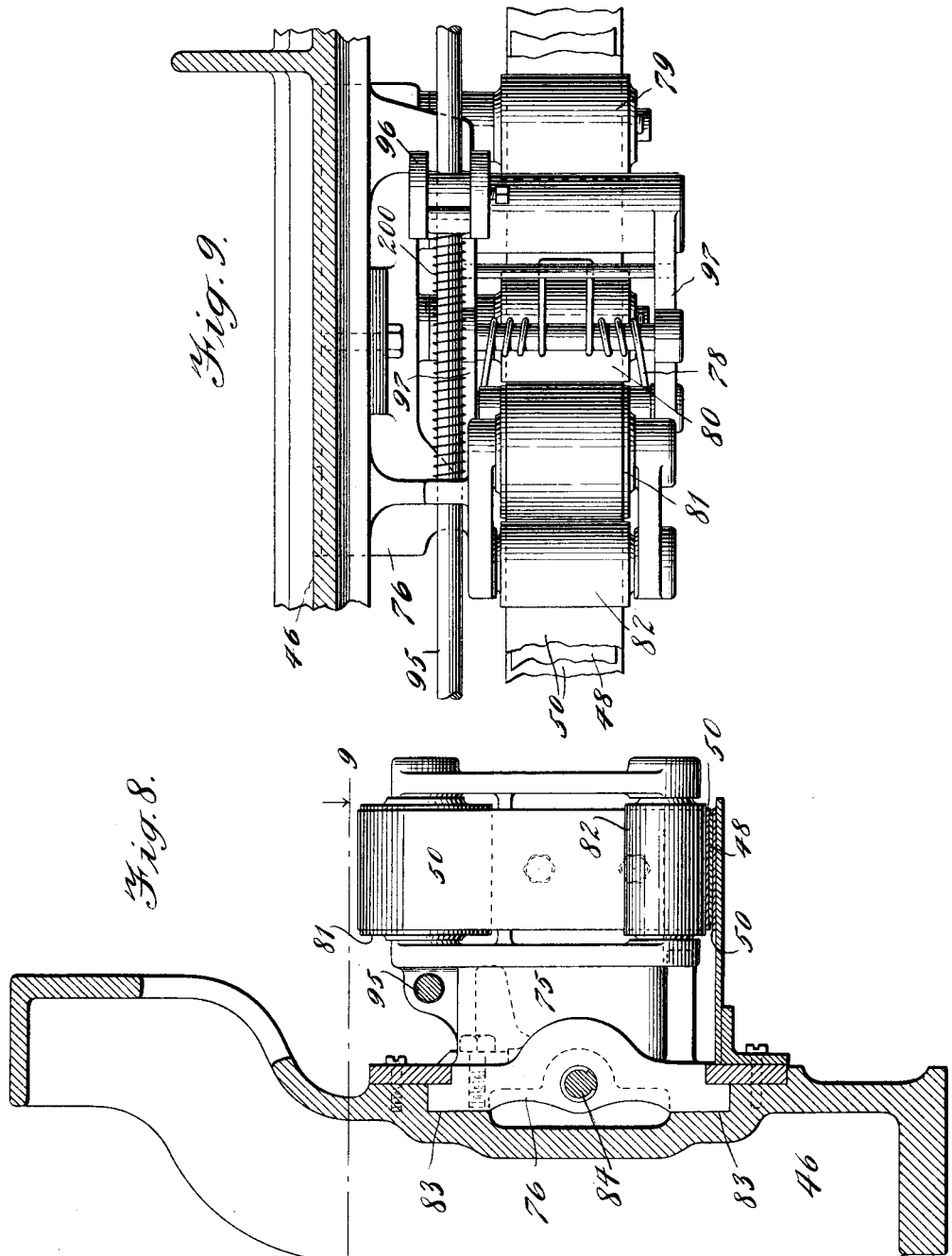
E. M. HAWKINS & C. R. SEYMOUR.
STAY APPLYING MACHINE.
APPLICATION FILED JAN. 7, 1913.
1,171,949.
Patented Feb. 15, 1916.
15 SHEETS—SHEET 7.

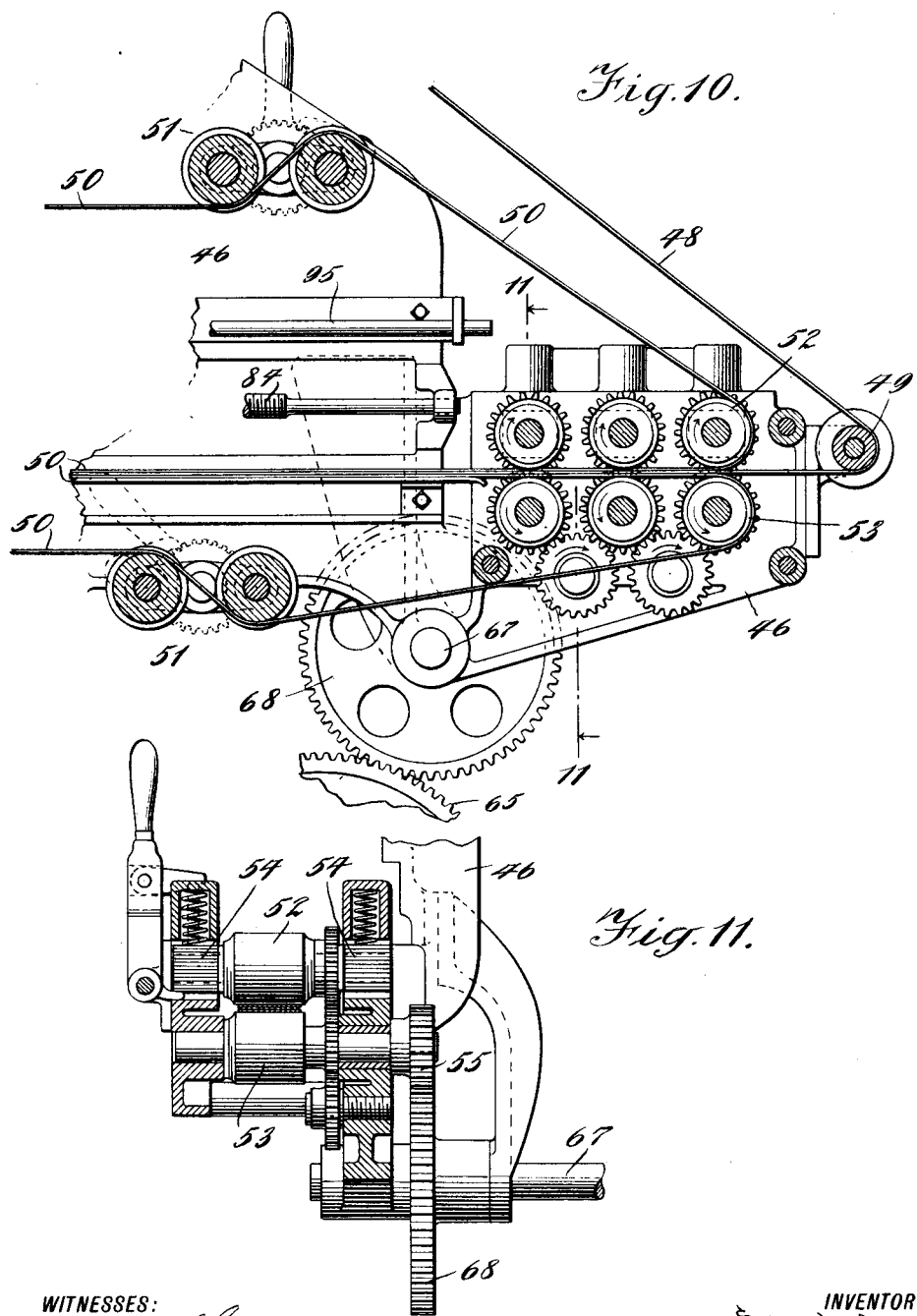

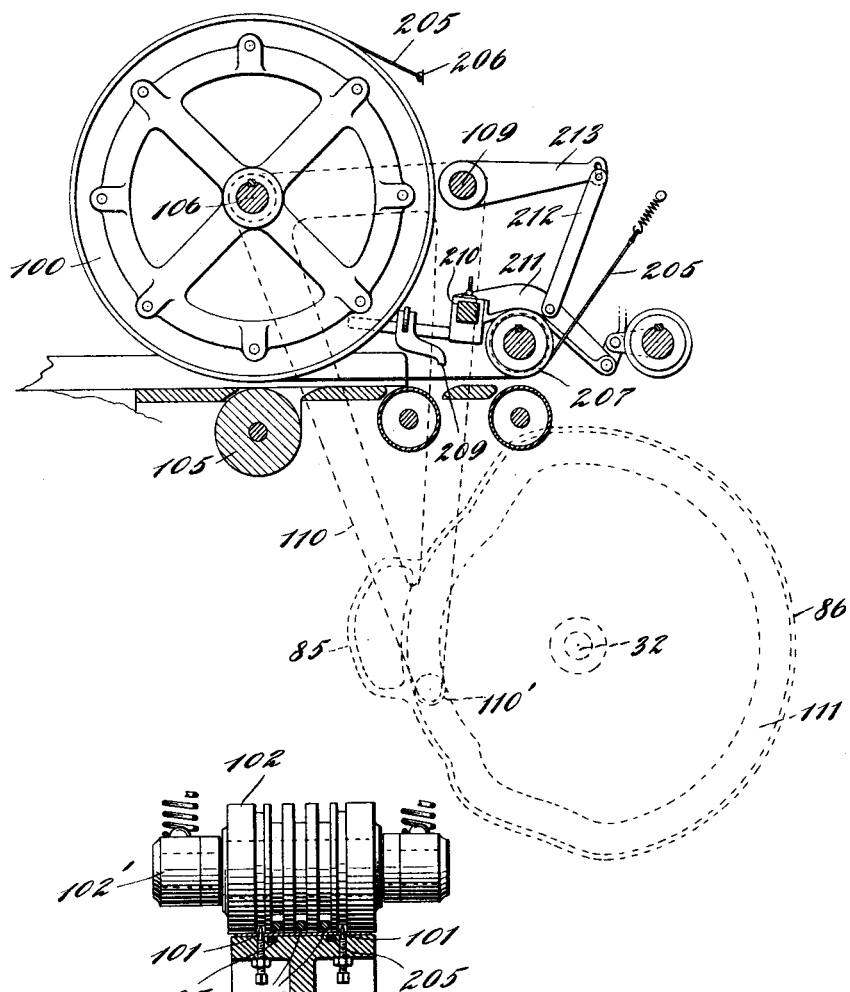

E. M. HAWKINS & C. R. SEYMOUR.
STAY APPLYING MACHINE.
APPLICATION FILED JAN. 7, 1913.
1,171,949.
Patented Feb. 15, 1916.
15 SHEETS—SHEET 10.
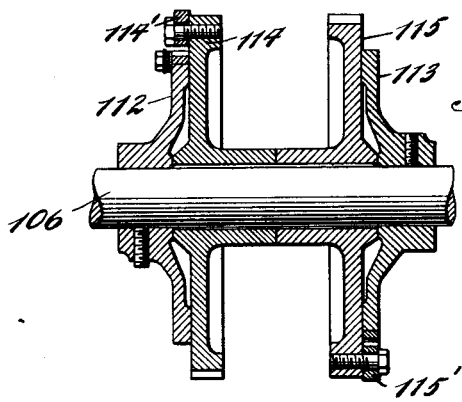
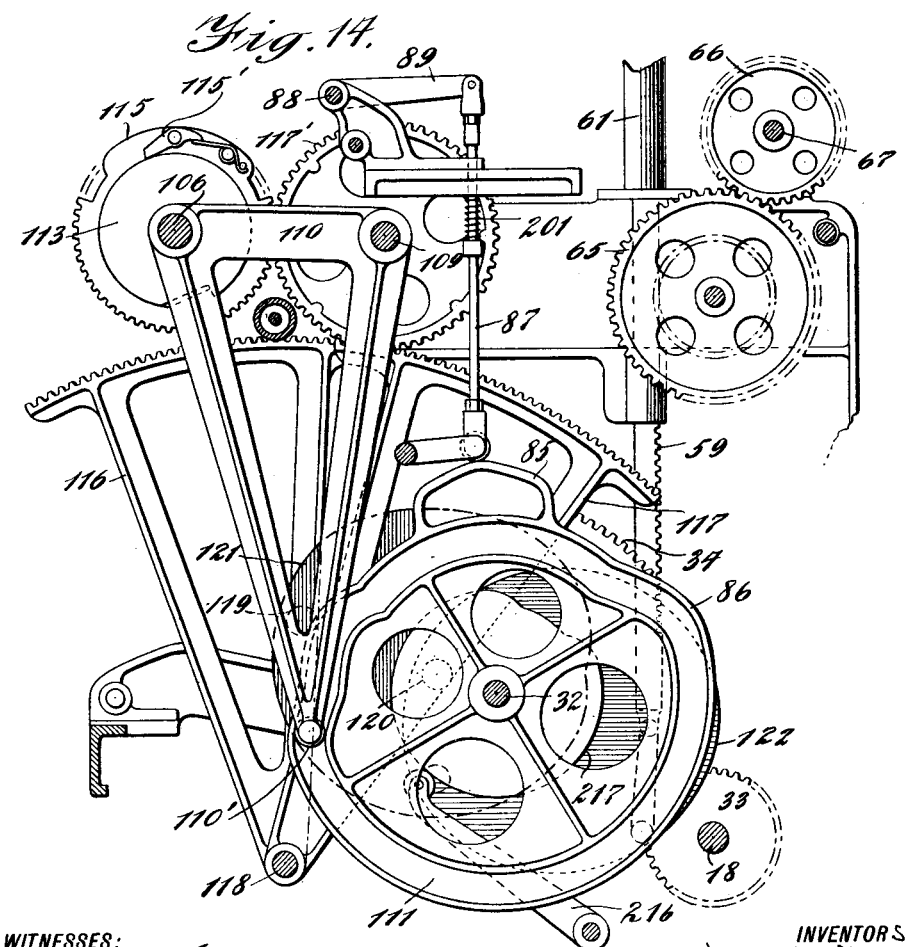
WITNESSES:
INVENTORS
BY
ATTORNEY

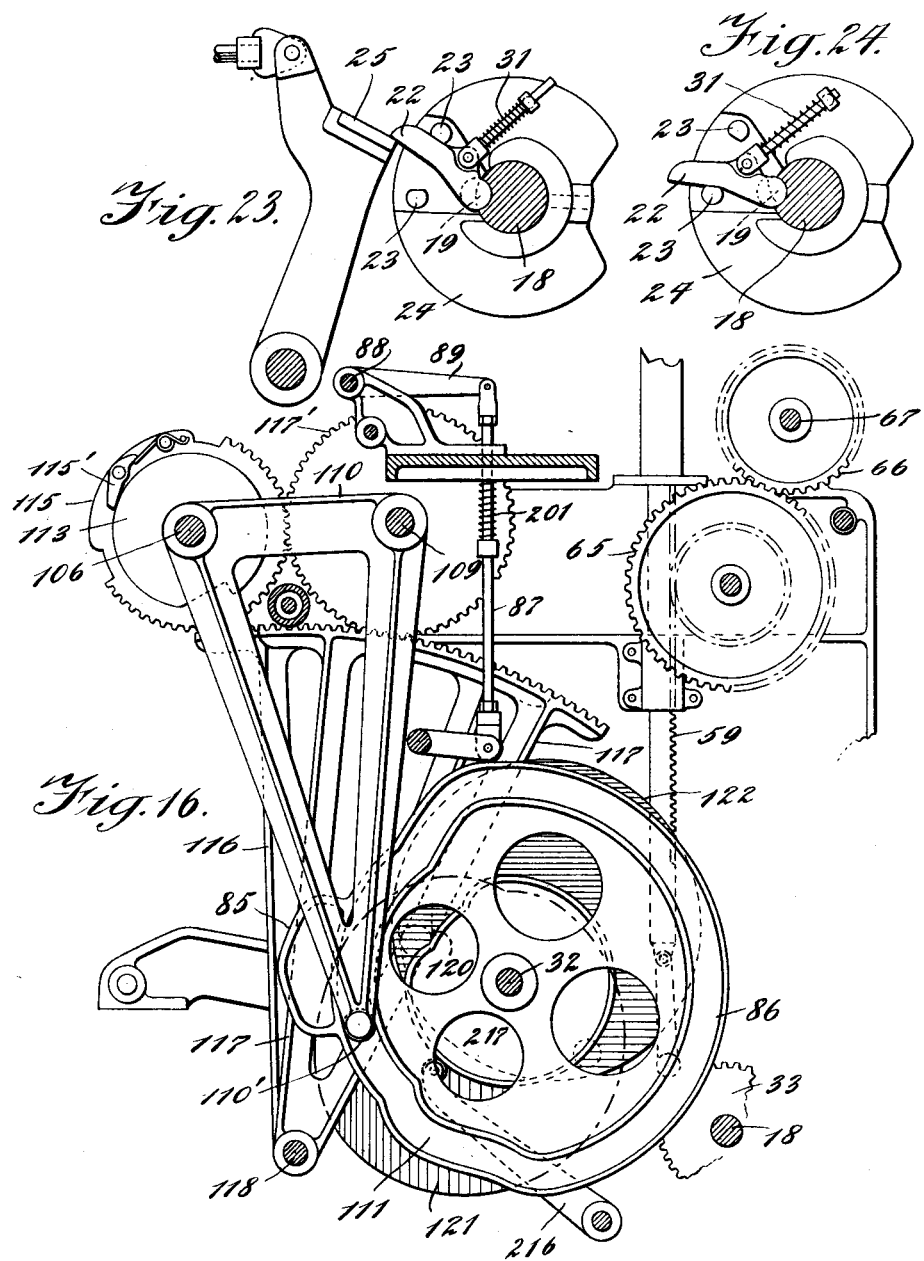

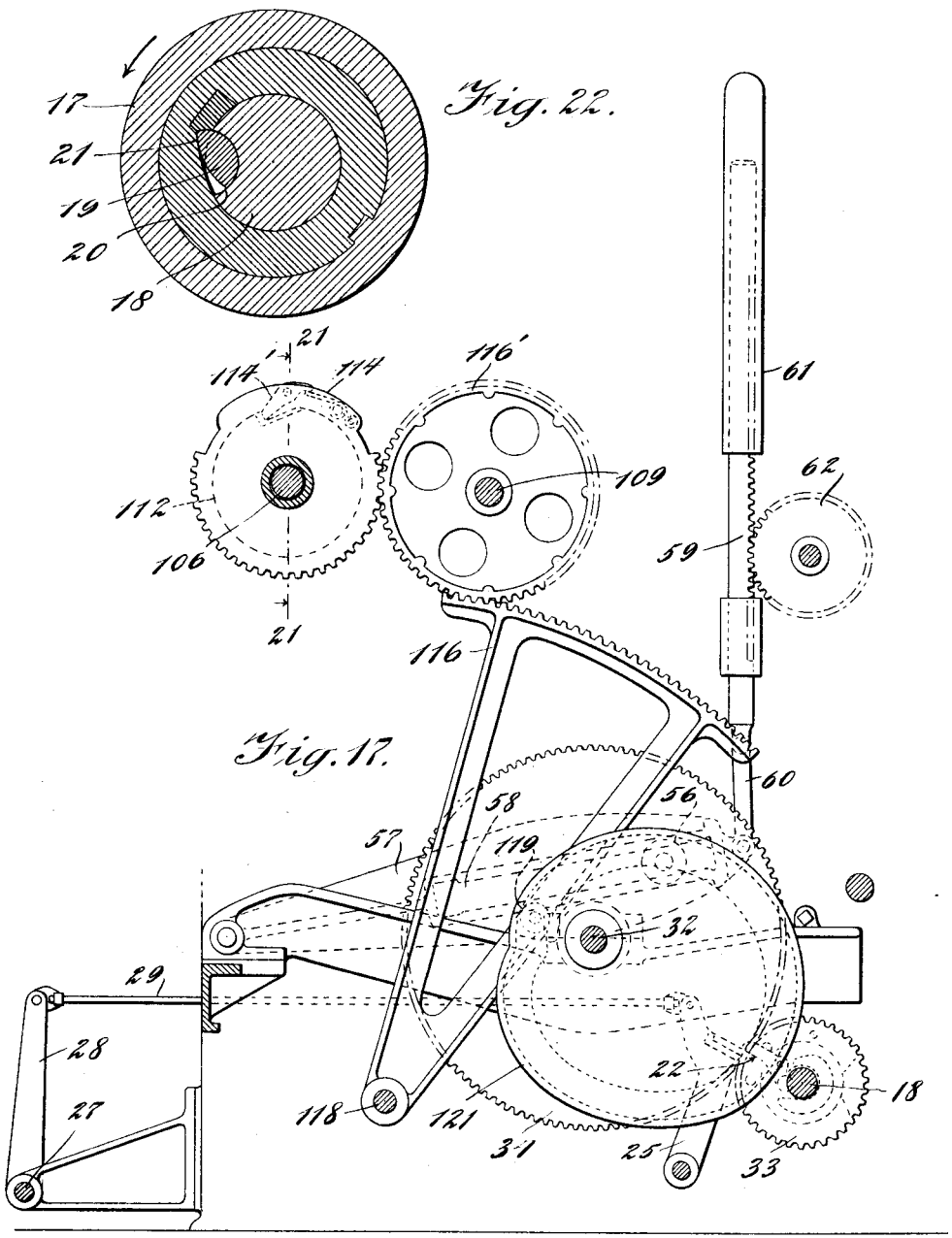

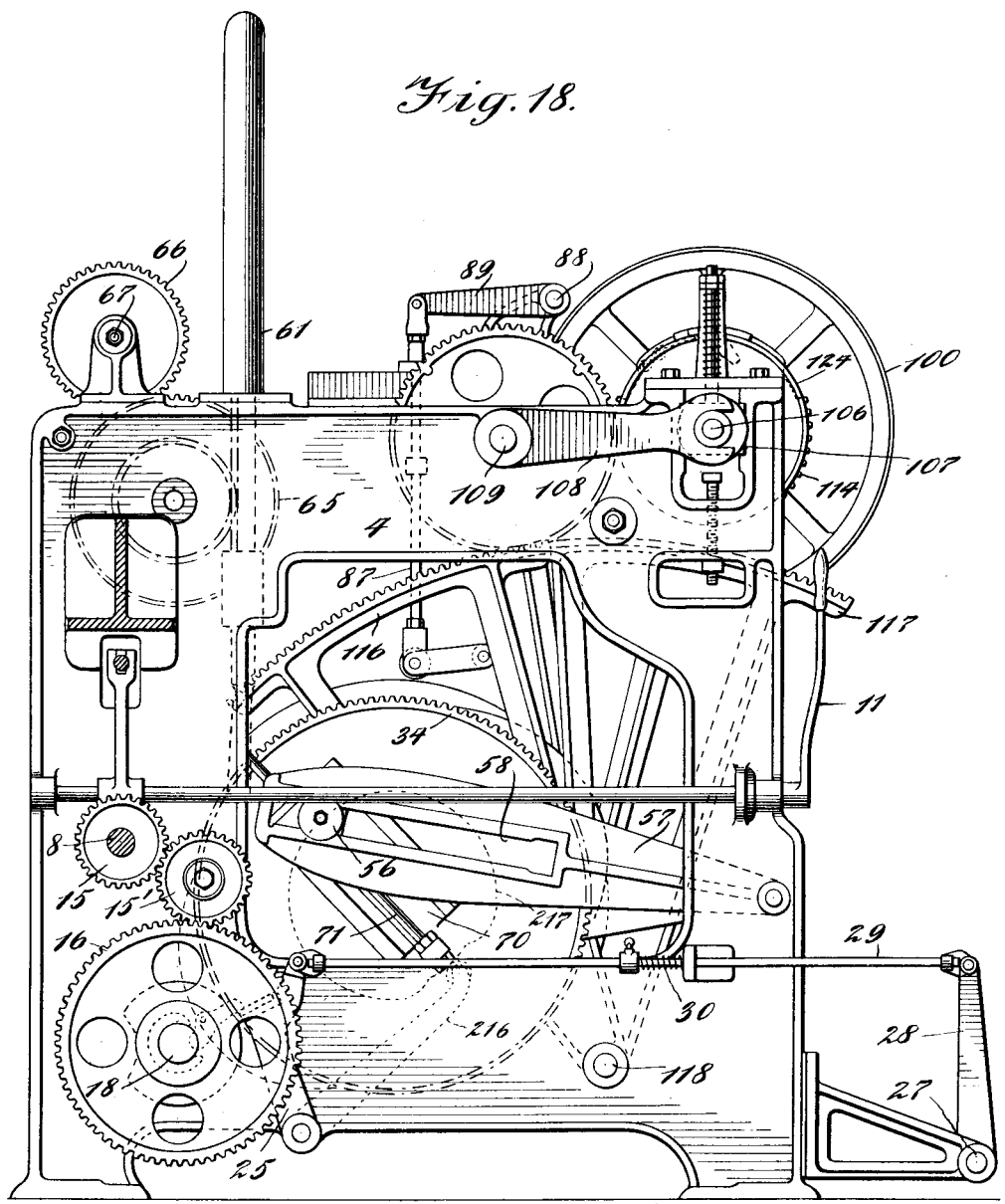

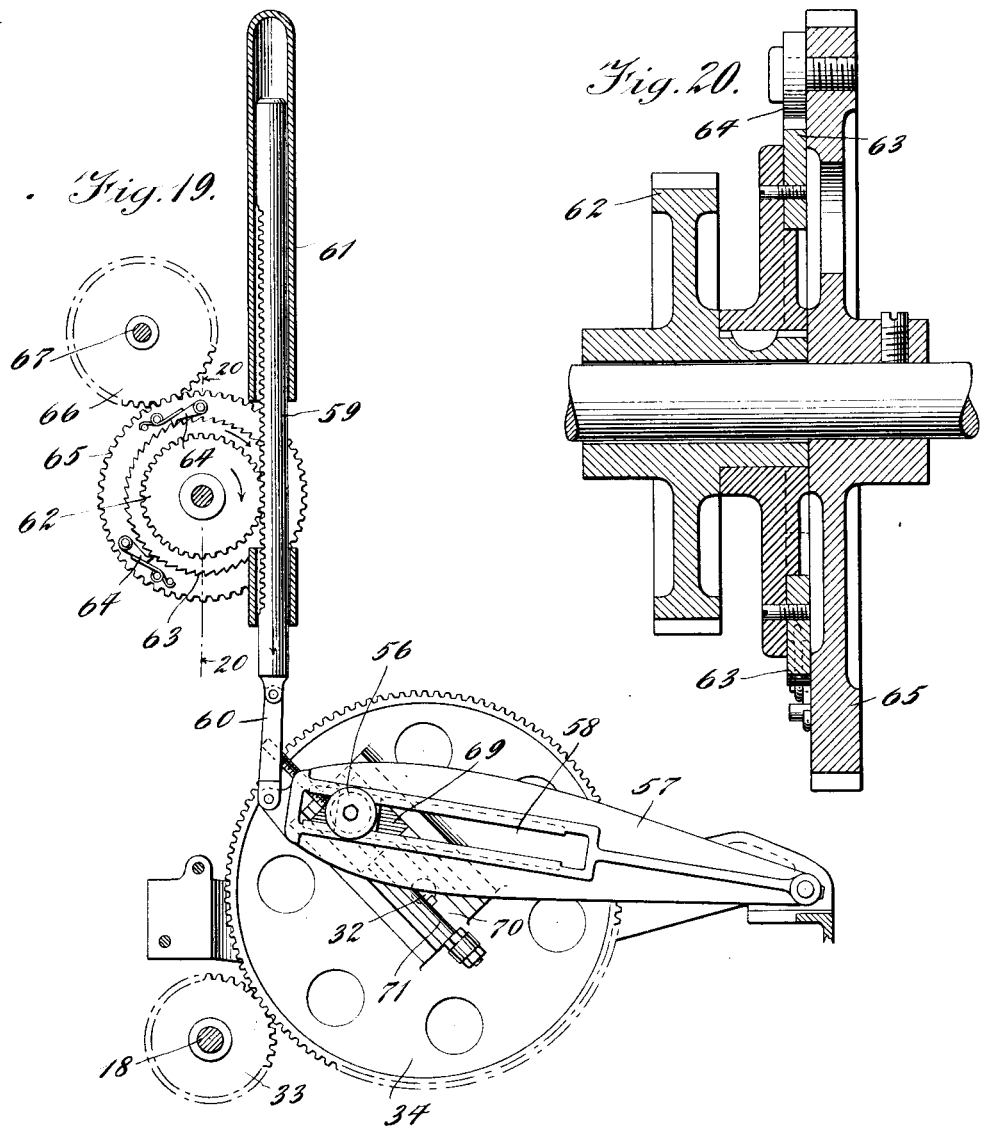

UNITED STATES PATENT OFFICE.

EDGAR M. HAWKINS AND CHARLES R. SEYMOUR, OF ROCHESTER, NEW YORK, ASSIGNORS TO M. D. KNOWLTON COMPANY, OF ROCHESTER, NEW YORK, A CORPORATION OF NEW YORK.

STAY-APPLYING MACHINE.

1,171,949. Specification of Letters Patent. Patented Feb. 15, 1916.

Application filed January 7, 1913. Serial No. 740,601.

*To all whom it may concern:*

Be it known that we, EDGAR M. HAWKINS and CHARLES R. SEYMOUR, citizens of the United States, and residents of Rochester, in the county of Monroe and State of New York, have invented certain new and useful Improvements in Stay-Applying Machines, of which the following is a specification.

This invention relates to a stay-applying machine and particularly to a stay-applying machine of the type disclosed in Letters Patent No. 1,057,096, issued March 25, 1913, which is especially adapted for applying fastening stays in flat form to the joints of corrugated or other paper board cartons in the manufacture of the latter; the main object of our present invention being to simplify and otherwise improve the construction and operation of the machine of the aforesaid patent in a way to render it more efficient for use under varying kinds and conditions of work.

The machine disclosed in the aforesaid patent, as also the machine of the present application, comprises the following main instrumentalities, to wit, means for feeding a continuous stay-strip to the machine from a reel or other source of supply, means for severing said strip into stays of desired lengths, a work-support, and means for conveying the severed stays to the cartons or other work on said support and applying the same thereto. In the prior machine, however, the feeding means for the continuous stay-strip comprises a reciprocating device having a pair of jaws which are operative to grip and feed the stay-strip upon the forward movement of the device and to release and move freely of the stay-strip upon the backward or return movement of the device. The feeding movement imparted to the stay-strip by this device is a fixed one and the length of stay so provided is that measured by the distance in advance of the severing means through which the strip is fed. In order to provide an increased feeding movement of the strip over that provided by the action of this reciprocating feed device, whereby to provide a greater length of stay, the conveying means is operated as a supplemental feed device. It has been found in practice, however, that it is preferable to omit the said conveying means as a part of the strip feeding means and to provide a feeding means independent of said conveying means that will be capable of adjustment to feed any desired length of stay. Such a feeding means, in a preferred form of our invention as here disclosed, comprises a pair of coöperating feed belts having a feeding movement that is adjustable to feed a desired length of strip to the machine, in combination with severing means located and operative between the adjacent strip-engaging belt runs and which severing means is adjustable in position lengthwise of said runs to sever the continuous strip into stays of a length substantially corresponding to the feeding movement of the belts.

In addition to this improvement in the stay-strip feeding means, our present invention also comprises various other novel features of construction and arrangements and combinations of parts, all as hereinafter referred to in detail and more particularly pointed out in the appended claims.

In order to enable those skilled in the art to make and use our invention, we will now proceed to describe the same in connection with the accompanying drawings illustrating a machine embodying our invention, wherein like reference characters in the several views indicate like parts.

In said drawings: Figure 1 is a front end elevation of the machine embodying our invention. Fig. 2 is a vertical section of the same taken on line 2—2 of Fig. 1, looking in the direction of the arrows. Fig. 3 is an enlarged vertical section corresponding to that of Fig. 2, but showing only the upper part of the machine. Fig. 4 is an enlarged side elevation of the machine looking from the right as viewed in Fig. 1, with the frame at the upper part of the machine carrying the stay-strip feeding and severing mechanisms with certain of their associated parts, removed. Fig. 5 is an enlarged view of the mechanism shown at the upper left-hand portion of Fig. 3, comprising certain coöperating parts of the stay-strip feeding, severing, conveying and applying means, and illustrates the movable cutter of the severing means in its lowered or strip-cutting position. Fig. 6 is an end view of the mechanism shown in Fig. 3, looking from the left-hand end of that figure. Fig. 7 is a view of part of the mechanism shown in Fig. 5, but still further enlarged, and illustrates the movable cutter of the severing mechanism in its raised or inoperative position.

Fig. 8 is a vertical section through that part of the machine shown in Fig. 7, the section being taken on line 8—8 of said figure, looking in the direction of the arrows, and illustrates the adjustable sliding connection of the severing means with its supporting frame. Fig. 9 is a horizontal section taken on the line 9—9 of Fig. 8 and illustrates said severing mechanism in top plan. Fig. 10 is an enlarged view, in section and elevation, of that part of the stay-strip feeding mechanism shown at the upper right-hand end of Fig. 3, and shows the pressure rollers between which the feed-belts pass at that end where the stay-strip is entered between them, and also the tightening devices for maintaining the feed belts under proper tension. Fig. 11 is a section taken on the line 11—11 of Fig. 10, looking in the direction of the arrows, and illustrates the operative connections between the upper and lower sets of pressure rollers and also the means for yieldingly maintaining those sets of rollers in operative relation. Fig. 12 is a detail, in section and elevation, illustrating the so-called "stay-wheel" constituting the main element of the stay-strip conveying and applying means, the means for stripping the stays from said wheel when brought to position for application to the work, one of the gages for positioning the work on the work-support and the means for automatically moving the same to and from its operative or gaging position, and also illustrating in dotted lines a part of the means for shifting the stay-wheel vertically during the operation of the machine. Fig. 13 is an enlarged detail, partly in section, illustrating the means for causing the stay-strip to be operatively engaged by the stay-wheel by the impalement of the strip on pins projecting from the periphery of said wheel. Fig. 14 is an enlarged vertical section of the machine taken on line 14—14 of Fig. 1, looking in the direction of the arrows, and illustrating certain of the actuating mechanism for the stay-strip feeding, severing, conveying and applying devices. Figs. 15 and 16 are views of a portion of the mechanism shown in Fig. 14, but illustrating the changed positions of the parts as occuring at different stages during the operation of the machine. Fig. 17 is an enlarged vertical section taken on the line 17—17 of Fig. 1, looking in the direction of the arrows, and illustrates more clearly part of the mechanism shown in Figs. 14, 15, and 16. Fig. 18 is an enlarged vertical section taken on the line 18—18 of Fig. 1, looking in the direction of the arrows, and showing certain of the actuating mechanism from that side thereof opposite that shown in Fig. 15. Fig. 19 is an enlarged vertical section taken on the line 19—19 of Fig. 1, and illustrates the means for imparting an adjustable feeding movement to the feed belts. Fig. 20 is an enlarged sectional detail, the section being taken on the line 20—20 of Fig. 19, looking in the direction of the arrows. Fig. 21 is an enlarged sectional detail, the section being taken on the line 21—21 of Fig. 17, looking in the direction of the arrows and illustrates certain of the motion transmitting mechanism for the stay wheel, and Figs. 22, 23, and 24 are detail views illustrating part of the clutch-mechanism controlling the operation of the machine.

The frame for supporting the operative parts of the machine may be of any desired construction suitable for the purpose. In the present case it comprises a main or subframe, including two vertical end standards 2, 2', connected by cross-braces 3, 3, and an intermediate vertical standard 4 supported on said cross-braces and connected with the end standards by suitable tie-rods, and a secondary or super-frame adjustably mounted on said main frame.

The main power transmission mechanism is located at the left-hand end of the machine mostly between the standards 2 and 4 of the main frame; the table or work support and the work feeding and pressing rolls are located at the right-hand end of the machine, mostly between the standards 4 and 2'; and the stay-strip feeding, cutting, conveying and applying devices are located at the right-hand end of the machine and in position above the said work-support.

Journaled in suitable bearings in the main frame at the left-hand end thereof is a driving shaft 8 adapted to be driven from any suitable source of power and having thereon the usual fast and loose pulleys, indicated at 9 and 10, from one to the other of which the driving belt may be shifted to control the operation of the shaft by a belt-shipper 11 of usual construction, which may be operated by a hand lever 12, through suitable connections. The shaft 8, which is continuously driven, has a pinion 15 thereon engaging a spur gear 16 through an intermediate pinion 15' to impart a continuous movement thereto, which said spur-gear is keyed to a sleeve 17 (see Fig. 22) loosely mounted on a shaft 18 from which the several operative parts of the machine are adapted to be operated and which said sleeve 17 is adapted to be clutched to or released from said shaft, for controlling the starting or stopping of the machine, by a suitable clutch device. This clutch device, which may be of any suitable type, is here shown as comprising a segmental clutch member 19 (see Figs. 22, 23, and 24) seated in a recess 20 in the shaft 18 and having a rocking movement in said recess to and from a position for effecting clutching engagement between the shaft and the sleeve by its engagement with a shoulder 21 on the inner wall of the sleeve, as shown in Fig. 22, the said clutch member being provided at one end thereof with a radially projecting controller arm 22 which is movable between two stops 23, 23, on a disk 24, fixed to the shaft 18, and which when moved against one or the other of said stops rocks the clutch member to either clutching or unclutching position. In the present case, a pivoted arm 25, controlled in its position from a foot treadle 26 through a rock-shaft 27 and intermediate connections 28 and 29, is normally held by suitable means, such as the spring 30 on the connection 29, in a position to engage the controller arm 24 and hold it against the upper stop 23, as shown in Fig. 23, with the clutch-member in clutching position and the machine at rest. To start the machine, the arm 25 is moved from its position of engagement with the clutch controller arm 24, whereupon said controller arm will be automatically operated under the action of a spring 31 to move against the lower stop 23 as shown in Fig. 24 and so rock the clutch member to clutching position.

The several operative parts of the machine, other than the feed and presser rolls for acting on the work subsequent to the application of the stays thereto, are driven from the clutch controlled shaft 18. A shaft 32, driven from said shaft 18 through gearing 33—34 (see Fig. 17), has fixed thereto a series of actuating devices for imparting the desired movements to the stay-strip feeding, cutting, conveying and applying mechanisms through suitable transmission devices, which latter will hereinafter be described in connection with the description of said actuated mechanisms.

Secured to the upper ends of the standards 4 and 2' of the main frame is a bed-plate 6 on which is mounted a saddle-plate 41 carrying the secondary or super-frame 46 to which is connected the main elements of the stay-strip feeding, cutting, conveying, and applying mechanisms. This saddle-plate 41 has a sliding dove-tail connection with the bed-plate 6 (see Fig. 3) in a manner whereby it may be laterally adjustable with its said connected parts relatively to the table or work-support of the machine, indicated at 42. As a convenient means for effecting the lateral adjustment of said saddle-plate, a screw-threaded adjusting rod 43, (see Fig. 1) having an operating handle 44, is supported in an endwise stationary position by brackets 7, 7, on the supporting frame and engages with a lug 45 in fixed relation with the saddle-plate. By turning this rod in the proper direction, it will impart to the engaged saddle-plate and connected parts a desired lateral adjustment according to the point at which it may be desired to apply the stays on the cartons or other work located on the work-support.

The super-frame 46 has a generally elongated form as shown in Figs. 2 and 3. Mounted on this frame at the top thereof is a reel 47 for carrying the continuous stay-strip 48. From this reel 47 the stay-strip is guided over a guide-roll 49 to the feeding device, which latter is here shown as comprising a pair of endless belts 50, 50, supported by suitably arranged guide rollers with their adjacent strip-engaging runs extending from a point adjacent the rear of the machine where they receive the stay-strip to a point adjacent the front of the machine where they deliver the strip to the stay conveying and applying means. Suitable belt-tighteners, as indicated generally at 51, 51, serve as a means to maintain the belts under proper tension. At their rear ends the belts pass between two sets of rollers, indicated at 52 and 53, which coöperate to yieldingly hold the belts in close relation to each other at such point (see Figs. 3, 10 and 11) whereby to assure a firm gripping of the strip by the belts and a consequent positive feeding of the same. Such yielding coöperation of the two sets of rollers may be effected in any desired manner but as here shown is effected by mounting the upper set of rollers 52 in vertically adjustable spring-pressed journal boxes 54 in the manner clearly shown in Fig. 11. The rollers 52 and 53 also serve as the direct means for imparting feeding movement to the feed belts, the same being geared together for movement in the proper direction as indicated by the arrows in Fig. 10, and one having a driving pinion 55, as most clearly shown in Fig. 11, which is operated to impart the desired movement to the feed belts by the following means: A crank 56 on one side of the gear wheel 34 (see Fig. 19) and having a constant uniform rotation imparted thereto by said wheel, engages a pivoted lever 57 within an elongated slot 58 therein and imparts a vibrating movement thereto, which lever in turn imparts a reciprocating movement to a rack 59 through a connecting link 60. This reciprocating rack 59, which is supported and guided in its movements by a tubular bracket 61, imparts an oscillating movement to an engaging gear 62, and the latter, acting through a ratchet 63 and pawls 64, imparts an intermittent movement of rotation to a gear 65, which intermittent movement is imparted to the feed belts from said gear 65 through suitable operative connections, here shown as comprising a gear 66, a shaft 67 on which said gear 66 is fixed, and a gear 68 splined to said shaft 67 and meshing with the driving pinion 55 of the belt driving rollers hereinbefore referred to. With this described actuating mechanism, the connections between the rack 59 and the feed belts are operative on one stroke of the rack to impart feeding movement to the belts and are idle on the return stroke of the rack whereby the belts will remain stationary, in this way obtaining the desired intermittent movement of the feed belts.

As a means to vary the feeding movement of the feed belts and thereby the length of stay-strip fed to the machine by them, the driving crank 56 is supported in a radially adjustable position on the gear wheel 34 whereby its throw may be varied and the extent of movement of the belt actuating means driven thereby be regulated accordingly. As a simple and convenient means for accurately adjusting the position of said crank, the latter is connected to a block 69, which is slidably mounted in a guide-way 70 on the gear wheel and adjusted by an endwise-stationary adjusting screw 71 engaging therewith, as shown in Fig. 19. The feed belts, as hereinbefore stated, are operative at each feeding movement of them to feed the continuous stay-strip forward to a position to be acted upon by the stay-strip cutting and conveying devices, the cutting device being operative to sever a desired length of stay from said continuous strip and the conveying device being operative to engage the severed stay and convey the same to the carton or other work to which it is to be applied. The said cutting device, which is located between the adjacent runs of the feed belts, is here shown (see Figs. 7, 8 and 9) as comprising a stationary cutter 72, formed at the lower edge of an opening 73 in a plate 74 attached to a bracket-arm 75 of a slide frame or carriage 76, and a coöperating reciprocatory cutter 77, shown in the present case as being yieldingly held against the plate 74 of the stationary cutter by a suitably supported spring 78 whereby wear of the parts caused by their frictional engagement will be automatically taken up. To provide space between the adjacent belt runs for the location of the cutting device therebetween, a series of guide rollers are provided which are arranged to direct a short length of the upper belt upwardly from the lower belt and over the cutting device located therebetween, in the manner clearly shown in Fig. 7. These guide rollers for the upper belt, indicated at 79, 80, 81 and 82, are journaled on bearing pins which are connected to the cutter supporting slide frame 76 hereinbefore referred to. This frame 76 is slidably mounted on the frame 46 within a guide way 83 therein for horizontal adjustment, whereby the position of the cutter may be adjusted lengthwise of the coöperating belt runs according to the length of stay to be severed from the continuous strip, and the belt guide-rollers 79—82 inclusive, being supported by the frame 74 in fixed relation with the cutter device, obviously will act to maintain the same relation of the belt to the cutter upon any adjustment of the latter. An adjusting screw rod 84 engaging with the frame 76 serves as a simple and convenient means for adjusting the position of the cutter.

Any suitable means may be employed for operating the cutter, the means here shown (see Figs. 14, 15 and 16) comprising a cam 85, in the form of a pronounced rise on the periphery of a disk 86 on the cam shaft 32, a vertically arranged rod 87, supported in position to be engaged and elevated by said cam 85 at each revolution of the latter, a rock-shaft 88 having one arm 89 connected to said rod 87 to be operated thereby and having another arm 90 connected through a rod 91 with an arm 92 of a second rock-shaft 93, which latter in turn has another arm 94 connected to a slide rod 95 (see Figs. 5 and 7) to which is adjustably connected one end of a belt-crank 96, which is fulcrumed on a pivot on the frame 76 and is formed with two arms 97, 97, (see Fig. 9) which are forked at their ends and loosely engage a horizontally arranged pin 98, connected with a plate 99 secured to the reciprocatory cutter 77. With this described actuating mechanism for the cutter, each upward movement of the rod 87 as imparted thereto by the cam 85, imparts a forward movement to the slide rod 95 through the intermediate connections, which movement of said slide rod operates to rock the bell-crank 96 and move the cutter 77 from its normal raised position as shown in Fig. 7, to a lowered cutting position as shown in Fig. 5. A return movement of the cutter 77 and its actuating mechanism to their normal position following the disengagement of the cam 85 from the rod 87 may be effected by any suitable means, the means here shown comprising a spring 200 on the rod 95 and a spring 201 on the rod 87, the spring in each case expanding between a stationary part and a collar on the rod, as shown.

As a means for supporting the cut end of the continuous strip in a position to be fed over the stationary cutter 72 when advanced by the feed belts subsequent to the action of the cutting device, a pivoted guide 202 is located immediately to the rear of the stationary cutter 72 (see Fig. 7) which will yield downwardly upon the descent of the movable cutter 77 into engagement therewith, as shown in Fig. 5, and which upon the ascent of the movable cutter will automatically rise under the action of a spring 203 and lift the supported end of the strip to a position above the stationary cutter for further feeding movement.

The stay-strip conveyer, in so far as it concerns certain features of the present invention, may be of any suitable construction and operation rendering it capable of performing its required functions. In the present machine, as in the machine of the aforesaid patent, said conveyer is in the form of a rotary wheel, indicated at 100, which is supported in such position with respect to the stay-strip feed device and the work-support as to receive at its upper side the stay-strip delivered by said feed device and convey the same to a position at its under side, where it is removed therefrom and applied to the carton on said work-support. As a simple means of effecting holding engagement of the conveyer with the stays and at the same time permitting of the ready removal or disengagement of the stays from the conveyer for application to the cartons, said conveyer is provided on its periphery with a series of spurs or points 101 which operate to pierce the stays and effect the desired holding engagement of the conveyer therewith as stated. The conveyer, in addition to its rotary movement, also has a bodily movement in a vertical direction between the point at which it engages the stray-strip and the work-support where it delivers the severed stays, the same being in a lowered position when the stay-strip is fed forward by the feed device and thereafter being raised to engage the stay-strip by means of its points 101. In the operation of the machine, the action of the feed device is so adjusted as to cause it to feed the stay-strip forward a sufficient distance to bring the front end thereof to a position slightly in advance of the vertical center of the conveyer as shown in Fig. 5, whereby its engagement by one or more of the points on the conveyer at the upward movement of the latter will be assured, and as a means to coöperate with the conveyer to cause said strip to be properly engaged or pierced by the points thereon, a presser roll 102 is supported by a pivoted spring-pressed bracket 102′ in a central position above the conveyer 100 which is operative to yieldingly engage the stay-strip at its upper side and hold the same against the upward pressure of the conveyer points when brought into engagement therewith; the said presser roll being provided with peripheral grooves therein to receive the points on the conveyer, as clearly shown in Figs. 5 and 13. A guide plate 103, attached at one end to a stationary support and having its opposite end forked and extending forward beneath the presser roll 102 through grooves therein, as shown in Figs. 5, 7 and 13, operates to assure the proper guidance of the front end of the stay-strip beneath said presser roll. After the conveyer has moved bodily upward and engaged the stay, which was severed from the continuous strip during the rotation of the conveyer in its lowered position, it then makes a one-half revolution to convey the front end of the severed stay to a point at the under side thereof in position directly above the work-support. In this position of the conveyer the machine is automatically brought to a stop. The severed stay is now said to be "placed", as it has been brought to proper position for application to the carton or other work on the work-support. During the operation of the machine in thus placing the stay, or subsequent to such operation, a carton is located on the work-support, preferably against suitable end and side gages to assure the application of the stay thereon in proper position. The machine is now started again and the conveyer is first caused to bodily descend into contact with the carton and press the end of the adhesively coated stay thereon with sufficient pressure to cause a firm adherence of the same thereto, after which the conveyer is caused to rotate in contact with the carton to apply the same therein and at the same time, preferably coöperating with a roll 105 at the under side of the carton, feed the latter forward to position to be received between two sets of positively driven rolls which coöperate to exert an additional pressure on the applied stays in substantially the same manner as in the machine of the aforesaid patent. The conveyer, in operating to apply the severed stays to the cartons as described, serves as a stay applying device as well as a stay-conveying and placing device, and while such different operations might be performed by separate devices without departure from certain features of the present invention, they are preferably performed by the one main device as described, which device will hereinafter be referred to as the stay-wheel. After this stay-wheel has applied the stay to the carton, it completes a one-half revolution and then moves bodily upward to engage the forward end of the stay which has been fed forward to position to be so engaged during the described stay-applying operation of the stay-wheel.

The stay wheel may be operated in the manner described by any suitable means. As here shown (see Figs. 1, 2, 4 and 18) it is mounted on a shaft 106 which is journaled at its opposite ends in vertically movable journal boxes 107, 107, in the frame standards 2, 2′, and which is also engaged at its opposite ends by the forked arms 108, 108, of a rock-shaft 109. Mounted on the latter shaft is a bell-crank lever 110 having one arm connected with the shaft 106 and having its other arm, by means of a roller 110′ thereon, in operative engagement with a grooved cam 111 formed on one side of the disk 86 which carries the cutter actuating cam 85. Rotation of the cam 111 operates to rock the bell-crank 110 about its axis in the shaft 109 and causes the same to raise and lower the shaft 106 and impart to the stay-wheel thereon its described up and down movement, that is, its upward movement to engage a new stay following its rotary movement in applying the preceding stay, and thereafter its downward movement to press the new stay into engagement with the carton, following its rotary movement in conveying the stay from its position of severance to position for application to the carton. The action of the cam and bell-crank in raising and lowering the stay wheel is clearly shown in Figs. 14, 15 and 16. To impart the desired rotary movements to the stay wheel intermediate of its said bodily vertical movements, that is, its rotary movement for conveying and placing the severed stays following its upward movement to stay applying position and its subsequent rotary movement for applying the stays following its downward movement to stay-applying position, means are provided as follows: The shaft 106 on which said stay-wheel is mounted has two peripherally shouldered or ratchet disks 112 and 113 affixed thereto (see Figs. 1, 14, 15, 16 and 17) which are adapted to be engaged by pawls 114' and 115' carried by gear wheels 114 and 115 respectively, which said gear wheels are loosely mounted on the shaft 106 for oscillating movement and are engaged through gear wheels 116' and 117' on the shaft 109 by sector gears 116 and 117 respectively, mounted on a fulcrum shaft 118. These sectors 116 and 117 are respectively provided with rollers 119 and 120 which are engaged by grooved actuating cams 121 and 122 on the shaft 32, which said cams operate to impart an oscillating movement to the engaged sectors. With this described means, the cam 121 operating through its described connections to the shaft 106 (see Fig. 17), will impart to the stay wheel 100 its described rotary stay conveying and placing movement at the proper time in its cycle of operation, and subsequently the cam 122, operating through its connections to the shaft 106, will impart to said stay wheel its described rotary stay applying movement also at the proper time in its cycle of operation; this stay-applying movement being continued to complete the second one-half revolution of the stay wheel as hereinbefore described. A friction brake 123 coöperating with a brake wheel 124 on the shaft 106 holds the stay-wheel from rotation during the idle or return movement of the oscillatory sectors and associated gearing and prevents rotary movement of the same except when positively driven by said parts on their forward or working strokes.

Referring to Figs. 14 to 17 inclusive, illustrating certain of the operating mechanism for the stay wheel and the strip feeding and cutting devices, Fig. 14 shows the position of the parts at a time when the stay wheel is raised and ready to begin its stay conveying movement of rotation; Fig. 15 shows the position of the parts when the stay wheel has completed its said conveying movement of rotation and is about to be lowered to press the stay into contact with the work; and Fig. 16 shows the position of the parts with the stay wheel lowered and during its said applying movement of rotation. In Fig. 17, the position of the parts, which are those for imparting the conveying movement of rotation to the stay-wheel, corresponds to that shown in Fig. 15. The said stay-wheel has a longitudinally sliding keyed connection with the shaft 106 in order to permit of its lateral adjustment relative to the work support of the machine as hereinbefore described, and it is connected with the super-frame 46 for lateral adjustment therewith by means of an arm 127 extending from said frame and engaging with the hub of the stay wheel as clearly shown in Fig. 1. Also connected with the frame 46 is a stay moistening device which comprises a roll 128 of felt or other suitable absorbent material which receives water from a tank 129 through a faucet 130 and applies the same directly to the gummed surface of the stay by contact therewith. The stay-strip as used in this machine may be rendered adhesive in any suitable way and at any suitable or desired point in its passage through the machine, but it has been found preferable in practice to employ a previously gummed stay and apply moisture to the same at the front end of the machine and preferably while being carried on the periphery of the stay wheel.

As a means for positively assuring the stripping of the stays from the stay wheel when brought to a position at the under side thereof for application to the cartons, stripping wires 205, 205, are connected at one end with the super-frame at 206 and from thence pass about the stay wheel in peripheral grooves therein (see Fig. 13) to a point at the under side thereof where they leave the stay wheel in a line horizontally tangent thereto, (see Figs. 3 and 12) and pass forward beneath the guide roller 207 and from thence upwardly to a bracket 208 depending from the super-frame as shown. With this arrangement of stripping wires the stays are positively stripped from the stay wheel at the desired point.

The gages with which the front end of the cartons engage in being positioned on the work support are indicated at 209 (see Figs. 1, 3 and 12). These gages are adjustably attached to a cross-bar 210 carried by pivoted arms 211, which are connected by links 212 with arms 213 on the rock shaft 109. These connections between the gages and the shaft 109 are such that when the latter is rocked upon the lowering of the stay wheel to stay-applying position, as shown in Fig. 12, the gages will thereby be automatically raised from engagement with the carton and permit of the forward movement of the latter when advanced by the rotation of the stay wheel in applying the stay, and when the said shaft 109 is rocked upon the raising of the stay-wheel following the application of the stay, the gages will be automatically lowered to gaging position as shown in Fig. 3.

Under favorable conditions and with certain kinds of material the stays will be caused to properly adhere to the cartons upon their application thereto by the stay wheel 100. In order to assure their proper adherence under varying conditions however, means are provided for exerting a secondary or additional pressure upon the stays subsequent to their application by said stay wheel in substantially the same manner as in the machine of the aforesaid patent. This means comprises two sets of positively driven horizontally arranged rolls between which the cartons are fed by the stay wheel and which operate to feed the cartons therebetween with the stays under pressure until they are delivered from the machine at the rear thereof. These sets of rolls are operated from the driving shaft through a suitable train of gearing, as indicated in Fig. 4, to have the same surface speed as that of the stay wheel so as not to tear or otherwise injure the stays, and the rolls of one set are yieldingly supported relatively to the other so as to provide for any unevenness or irregularity in the work without damaging the same. The rolls of the lower set, indicated at 136, together with the table or work support 42, are mounted on a bed-frame 137 which is supported in a vertically adjustable position between the standards 2' and 4 by two eccentric shafts 138, 138, through the medium of pivoted eccentric connections 139 at the four corners thereof, the said eccentric shafts each having a worm and gear connection 140 with a handled adjusting rod 141 at one side of the frame as shown, by means of which the bed-frame may be conveniently raised or lowered to adjust the space between the said two sets of rolls and also between the roll 105 (which is also supported by said bed-frame) and the stay wheel 100, according to the thickness and character of the work to be operated upon.

The operation of the machine as shown and described, briefly stated, is as follows: The crank 56 on the gear wheel 34 is first adjusted to produce a feeding movement of the feed belts equal to the length of stay required for the work in hand. The cutting device is then set in proper position to sever the length of stay provided by the feed belts, and this position is such that the feed belts, irrespective of their length of feeding movement, will always feed the stay-strip to a predetermined position in the machine with its front end slightly in advance of the vertical center of the stay wheel. To effect this adjustment of the cutting device, the connection of its lever 96 with the slide rod 95 is first loosened, then the cutter frame or carriage 76 is shifted to bring the cutter to the desired position, which may be accurately fixed by means of suitable gages (not shown), after which the connection between the said lever and slide rod is again tightened. With the machine now properly adjusted it may be set in motion, following which the feed belts will operate to advance the stay-strip to its proper position in the machine; the cutter will sever the strip to provide the required length of stay; and the stay-wheel will first rise and engage the severed stay, then rotate to convey the front end of said stay to a position immediately above a carton on the work support and in predetermined relation therewith, then descend into engagement with said carton to press the forward end of the stay thereon, and then rotate in its lowered plane to roll and apply the stay onto the carton and at the same time feed the latter forward to the continuously operating feed and presser rolls. In this feeding movement of the carton, the stay-wheel is assisted by two auxiliary wheels 215, 215, which are fixed to the shaft 106 at either side of the stay-wheel (see Fig. 1) and preferably are provided on their peripheries with rubber or other material for frictional engagement with the cartons.

What we claim is:—

1. In a machine of the character described and in combination, means for feeding a stay-strip, means for severing said strip into stays for application to the work, and means for applying the severed stays to the work; said severing means being adjustable independently of the feeding means in a direction lengthwise of the strip to sever the strip into stays of different desired lengths.

2. In a machine of the character described and in combination, means for feeding a stay-strip, means for severing said strip into stays for application to the work, a work support, and means for conveying the severed stays to the work on said work-support: said feeding means being operative to feed the stay-strip to a predetermined position relative to the stay conveying means and said severing means being adjustable independently of the feeding means in a direction lengthwise of the strip to sever the strip into stays of different desired lengths.

3. In a machine of the character described and in combination, means for feeding a stay-strip, means for severing said strip into stays for application to the work, a work-support, and a rotary conveyer for conveying the severed stays to the work on said support; said feeding means being operative to feed the stay-strip to a predetermined position relative to the conveyer and said severing means being adjustable independently of the feeding means in a direction lengthwise of the strip to sever the strip into stays of different desired lengths.

4. In a machine of the character described and in combination, means for feeding a stay-strip, means for severing said strip into stays for application to the work, a work-support, and a rotary conveyer having means for engaging the severed stays and conveying them to the work on said work-support, said feeding means being operative to feed the stay-strip to a position to be engaged by the conveyer and said severing means being adjustable independently of the feeding means in a direction lengthwise of the strip to sever the strip into stays of different desired lengths.

5. In a machine of the character described and in combination, means for feeding a stay-strip, means for severing said strip into stays for application to the work, a work-support, and a conveyer for conveying the severed stays to the work on said support; said feeding means being adjustable to feed different lengths of stay-strip to a predetermined position relative to the conveyer and said severing means being adjustable independently of the feeding means in a direction lengthwise of the stay-strip to sever said strip into stays of a length substantially corresponding to the length fed to the conveyer by the feeding means.

6. In a machine of the character described and in combination, means for feeding a stay-strip, means for severing said strip into stays for application to the work, a work-support, and a rotary conveyer for conveying the severed stays to the work on said support; said feeding means being adjustable to feed different lengths of stay-strip to a predetermined position relative to the conveyer and said severing means being adjustable independently of the feeding means in a direction lengthwise of the stay-strip to sever said strip into stays of a length substantially corresponding to the length fed to the conveyer by the feeding means.

7. In a machine of the character described and in combination, means for feeding a continuous stay-strip, means for severing said strip into stays of desired lengths for application to the work, and means for applying the severed stays to the work; said feeding means being adjustable to feed different lengths of stay-strip, and said severing means being adjustable independently of the feeding means in a direction lengthwise of the stay-strip to sever said strip into stays of a length substantially corresponding to the length fed by the feeding means.

8. In a machine of the character described and in combination, means for feeding a continuous stay-strip, means for severing said strip into stays of desired lengths for application to the work, and means for applying the severed stays to the work; said feeding means having an intermittent movement and being adjustable to feed different lengths of stay-strip, and said severing means being adjustable independently of the feeding means in a direction lengthwise of the stay-strip to sever said strip into stays of a length substantially corresponding to the length fed by the feeding means.

9. In a machine of the character described and in combination, a work-support, a device movable to and from an operative position for applying stays to work on said work-support and imparting a feeding movement to the work, a gage for positioning the work on said work-support, and means for automatically moving the gage to inoperative work-releasing position upon the movement of said device to its operative position.

10. In a machine of the character described and in combination, a work-support, a device movable to and from an operative position for applying stays to work on said work-support and imparting a feeding movement to the work, a gage for positioning the work on said work support, and means for automatically moving the gage either to an inoperative work releasing position or to an operative work engaging position upon the movement of said device either to its operative or inoperative position respectively.

11. In a machine of the character described and in combination, a work-support, a rotary device movable to and from an operative position for applying stays to work on said work-support and imparting a feeding movement to the work, a gage for positioning the work on said work-support, and means for automatically moving the gage either to an inoperative work releasing position or to an operative work engaging position upon the movement of said device either to its operative or inoperative position respectively.

Signed at Rochester, in the county of Monroe, and State of New York, this 31st day of December, A. D. 1912.

EDGAR M. HAWKINS.
CHARLES R. SEYMOUR.

Witnesses:
 THOS. D. PATTON,
 R. E. WEEKS.

Copies of this patent may be obtained for five cents each, by addressing the "Commissioner of Patents, Washington, D. C."